United States Patent [19]

Darden

[11] Patent Number: 4,466,896

[45] Date of Patent: Aug. 21, 1984

[54] ETHYLENEDIAMINE TRIACETIC ACID SILOXANE STABILIZERS FOR INORGANIC SILICATES IN ANTIFREEZE/COOLANT FORMULATIONS

[75] Inventor: Jerome W. Darden, Austin, Tex.

[73] Assignee: Texaco Inc., White Plains, N.Y.

[21] Appl. No.: 518,335

[22] Filed: Jul. 29, 1983

[51] Int. Cl.³ .............................................. C09K 5/00
[52] U.S. Cl. .............................. 252/78.3; 252/389 R; 556/420
[58] Field of Search ............... 252/78.3, 389.3, 389.31; 556/420

[56] References Cited

U.S. PATENT DOCUMENTS

| | | | |
|---|---|---|---|
| 3,312,622 | 4/1967 | Pines et al. ........................ | 252/78.3 |
| 3,341,469 | 9/1967 | Pines et al. ........................ | 252/389 |
| 4,287,077 | 9/1981 | Wing .................................. | 252/75 |
| 4,344,860 | 8/1982 | Plueddemann .................... | 252/78.3 |

Primary Examiner—John E. Kittle
Assistant Examiner—Hoa Van Le
Attorney, Agent, or Firm—Jack H. Park; Kenneth R. Priem; David L. Mossman

[57] ABSTRACT

Stabilizers for inorganic silicate corrosion inhibitor additives in antifreeze/coolant formulations are described. The stabilizers are organosiloxanes which have ethylenediamine triacetic acid moieties as the solubilizing group. A particularly preferred stabilizer is N-(trimethoxysilylpropyl)ethylenediamine triacetic acid,

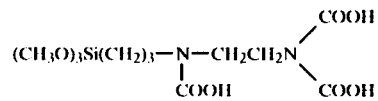

These stabilizers help prevent the corrosion-inhibiting silicate additives from precipitating out and thus extend the shelf life of antifreeze formulations into which they are incorporated.

13 Claims, No Drawings

ETHYLENEDIAMINE TRIACETIC ACID SILOXANE STABILIZERS FOR INORGANIC SILICATES IN ANTIFREEZE/COOLANT FORMULATIONS

BACKGROUND OF THE INVENTION

1. Field of the Invention

The invention relates to stabilizers for inorganic silicate corrosion inhibitors used in antifreeze/coolant formulations and particularly relates to such stabilizers which are organosiloxanes having carboxylic acid solubilizing groups.

2. Related Stabilizers in the Field

Antifreeze compositions containing glycols and various corrosion inhibitors are well known in the prior art as is illustrated by U.S. Pat. Nos. 3,282,846 and 3,362,910. The use of the relatively inexpensive and effective borax compounds and silicates in glycol formulations as corrosion inhibitors is well illustrated by these patents. It is conventional in this art to make a glycol concentrate which is then sold to end users for use as a coolant in automotive radiators and the like after dilution with water.

In the past, it has been found that glycol concentrates prepared using conventional corrosion inhibitors such as borax and silicates had a tendency to develop irreversible silicate gels upon standing for a period of time in a warehouse or store. The end user, when he attempted to pour the glycol concentrate into his automotive radiator, found that the concentrate had developed "slugs" or gels which either did not pour readily or which tumbled out in discrete masses along with the liquid. The present invention was developed to eliminate this gel formation.

In U.S. Pat. No. 4,149,985, there is disclosed that a gellation resistant glycol composition containing borate and silicate additives can be made wherein the order of addition of the additives and the pH of the solution is closely controlled in order to obtain the gellation resistant formulation.

In U.S. Pat. No. 3,312,622, there is disclosed a corrosion resistant glycol composition containing an organosilicon co-polymer having carboxylate salt groups and silicate groups.

Other organosiloxane compounds are known to help prevent the silicates from forming gels. See, for example, the compounds disclosed in U.S. Pat. Nos. 3,337,496 and 3,341,469. Particularly pertinent to the present invention are the ether modified polymethyl oxygen-containing silicone polymers of U.S. Pat. No. 4,287,077 which are also taught as being good gellation-resistant additives. Modification of organosiloxanes is necessary to make them soluble in the glycol antifreeze fluids.

Many types of organosiloxane compounds are known in the art. For example, U.S. Pat. No. 2,846,458 describes organosiloxane compounds that have been modified with ethers, particularly the mono- and diethers of glycols and polyglycols. Such materials were then known to be useful as surface-active agents, release agents, lubricants, antifoam agents and as cosmetic additives. These compositions did not encompass polymers of silicon.

A method for making carbalkoxyalkyl polysiloxanes is revealed in U.S. Pat. No. 3,065,202. Such compounds were useful as plasticizers for organopolysiloxane resins and rubbers and as lubricants. U.S. Pat. No. 3,105,061 teaches a method for the preparation of diorganopolysiloxane polymers by the reaction of diacyloxysilanes and siloxanes with mono- and dihydroxy silanes and siloxanes.

The addition of SiH compounds to aliphatic unsaturated compounds in contact with chloroplatinic acid can be achieved in the presence of hydroxyl compounds such as water or alcohols according to U.S. Pat. No. 3,398,174. The organosilicon compounds made therein may contain ether substituents.

Finally, various organosiloxane compounds having cyano-, ether-, hydroxy- or phenylorgano modifying moieties are taught in U.S. Pat. No. 4,331,555 which teaches that such compounds are useful as foam stabilizers in flexible polyester polyurethane foam.

There remains a need for a gellation resistant stabilizer that allows smaller effective amounts to be used and which is less expensive than those currently used.

SUMMARY OF THE INVENTION

The invention concerns a gellation resistant aqueous glycol composition comprising 85 to 98 percent by weight of an alkylene glycol, an alkylene glycol ether or mixtures thereof, an effective amount to reduce corrosion of an inorganic alkali metal silicate and an effective amount to improve gellation resistance of an organosiloxane having ethylenediamine triacetic acid as a solubilizing group.

DETAILED DESCRIPTION OF THE PREFERRED EMBODIMENTS

The glycols and glycol ethers which can be used as major components in the present composition include glycols, such as ethylene glycol, diethylene glycol, propylene glycol and dipropylene glycol and glycol monoethers such as the methyl, ethyl, propyl and butyl ether of ethylene glycol, diethylene glycol, propylene glycol and dipropylene glycol. Also useful are glycol diethers such as the methyl and ethyl diethers of ethylene glycol, diethylene glycol and dipropylene glycol. Ethylene glycol is particularly preferred as the major antifreeze composition component.

A number of known corrosion inhibitors and additives can be used in the present invention. The most preferred corrosion inhibitors are the alkali metal silicates, such as sodium metasilicate, potassium metasilicate and lithium metasilicate. Also preferred are the silicates represented by the formula

$$[M_{1/a}O]_b SiO_{(4-b)/2}$$

where M is a cation that forms a water soluble silicate, a is the valence of the cation represented by M and b has a value from 1 to 3, inclusive. This definition is used in U.S. Pat. Nos. 3,337,496 and 3,312,622.

Other corrosion inhibitors and additives may be used, such as alkali metal borates which include sodium tetraborate, potassium tetraborate, sodium metaborate and potassium metaborate. Other permissible components include alkali metal mercaptobenzotriazoles, alkali metal tolyltriazoles, alkali metal nitrates such as sodium nitrate and potassium nitrate, alkali metal nitrites such as potassium and sodium nitrite, alkali metal phosphates such as sodium phosphate and potassium phosphate, alkali metal benzoates and various antifoaming agents and dyes, if desired.

The stabilizer useful in this invention is an organosiloxane which has as its solubilizing group an ethylenediamine triacetic acid moiety. It is unusual that ethylenediamine triacetic acid (EDTA) would provide a useful solubilizing group for antifreeze additives since EDTA by itself is extremely corrosive to cast iron, as will be shown. However, as will also be shown, the organosiloxanes having EDTA solubilizing groups are shown in the following examples to be non-corrosive to cast iron.

A particularly preferred organosiloxane is N-(trimethoxysilylpropyl)ethylenediamine triacetic acid (TMSP-EDTA) which has the following structural formula

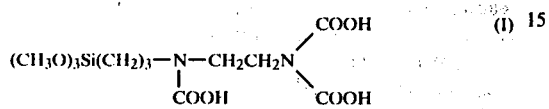

Gellation resistant additive compounds of the type described above may be prepared by reacting a polyalkylsiloxane with an allylic derivative of the solubilizing group or an unsaturated derivative of the solubilizing group in the presence of a catalyst such as chloroplatinic acid, triethylamine or triphenylphosphine. Reaction of a polyalkylsiloxane with EDTA in the presence of a dehydrogenation catalyst could also prepare the antigelling agents of this invention. The suitable reaction temperature for preparing these additives ranges between 25° and 150° C.

The amounts of corrosion inhibitors discussed above known to be effective are well known in the art. Of course, the amount will vary for each inhibitor. It is not possible to set forth exactly the amount of silicate to be used in each instance due to the complicating influence of the other corrosion inhibitors such as the aforementioned borates, triazoles, nitrates, nitrites and phosphates. Simple, accelerated aging tests can be used to determine the amount of silicate which when added will give the desired corrosion resistance. Generally, the proportion of silicates should range from about 0.025 to 1.0 percent by weight, preferably about 0.05 to 0.5 percent by weight.

The gellation resistant organosiloxane compound should be used at levels of about 100 to 10,000 ppm to prevent gellation of the inorganic silicates in antifreeze/coolant formulations. These limits are generally much lower than those found in much of the prior art.

Throughout this specification it is noted that the gellation inhibitor is first created and subsequently added to the alkylene glycol composition. However, an alternate approach, which may even turn out to be the preferred one in practice, is to form the gellation inhibitor in situ. The invention relates to a glycol composition containing these gellation inhibitors and is not restricted by the method by which this is accomplished.

The method of this invention will be further illustrated by the following examples which are not intended to limit the invention, but rather to illuminate it.

EXAMPLE 1

To an antifreeze concentrate formulation consisting of ethylene glycol, tolyltriazole, NaNO$_3$, and 0.3 wt.% Na$_2$SiO$_3$.5H$_2$O corrosion inhibitor was added N-(trimethoxysilylpropyl)ethylenediamine triacetic acid made by Petrarch Systems, Inc., hereafter referred to as Compound I, at a level of 375 ppm. The material was added as the trisodium salt, 50% aqueous solution. The stabilized antifreeze concentrate was placed in the storage stability test. The storage stability test consists of placing 100 g of the antifreeze or coolant formulation in an oven at 150° F. and noting the time needed for a gel to form. One day at 150° F. is approximately equal to one month at room temperature; thus, the storage stability test gives a measure of the shelf life of the antifreeze or coolant formulation.

The stabilized concentrate sample in this example showed no signs of gel formation after 14 days at 150° F., equivalent to a shelf life of greater than 14 months.

EXAMPLE 2

Unstabilized Antifreeze Concentrate

The same antifreeze concentrate used in Example 1 was placed in the storage stability test, except that no Compound I was added. The sample showed signs of gel formation after only four days at 150° F., equivalent to a shelf life of four months. Thus, the use of Compound I more than tripled the shelf life of the antifreeze concentrate.

EXAMPLE 3

To an antifreeze concentrate formulation consisting of ethylene glycol, Na$_2$B$_4$O$_7$.5H$_2$O, sodium benzoate, tolyltriazole, and 0.2 wt.% Na$_2$SiO$_3$.5H$_2$O was added 200 ppm of Compound I. The sample was placed in the storage stability test. The sample showed signs of gel formation after 21 days at 150° F., equivalent to a shelf life of 21 months.

EXAMPLE 4

To the same antifreeze concentrate used in Example 3 was added 500 ppm of Compound I. The sample was placed in the storage stability test. The material showed no signs of gel formation after 48 days at 150° F., equivalent to a shelf life of greater than 48 months.

EXAMPLE 5

The same antifreeze concentrate used in Examples 3 and 4 except with no Compound I added was placed in the storage stability test. The sample showed signs of gel formation after only ten days at 150° F., equivalent to a shelf life of ten months. Thus, the use of 200 ppm of Compound I effectively doubled the shelf life of the antifreeze, while the use of 500 ppm of Compound I increased the shelf life of the antifreeze by nearly fivefold.

EXAMPLE 6

To an antifreeze concentrate formulation consisting of ethylene glycol, tolyltriazole, NaNO$_3$, and 0.3 wt.% Na$_2$SiO$_3$.5H$_2$O were added 200 ppm of Compound I, and the sample placed in the storage stability test. The sample showed no signs of gel formation after 48 days at 150° F., equivalent to a shelf life of greater than 48 months. The same antifreeze concentrate with no Compound I added showed gel formation after only three days at 150° F., equivalent to a shelf life of only three months.

EXAMPLE 7

In order to test the corrosion-inhibiting properties of antifreeze formulations made with Compound I, the ASTM D-1384-70 Corrosion Test for Engine Coolants in Glassware was run on the stabilized formulation prepared in Example 6. The results were as follows.

| ASTM D-1384 Glassware Corrosion Test | | | | | | |
| --- | --- | --- | --- | --- | --- | --- |
| | Weight loss, mg/coupon (avg. of 3 tests) | | | | | |
| Antifreeze Concentrate | Cu | Brass | Steel | Fe | 70/30 Solder | Al |
| Stabilized Compound, Ex. 6 | 3 | 3 | 2 | 3 | 1 | −6 gain |
| ASTM spec., max. | 10 | 10 | 10 | 10 | 30 | 30 |

EXAMPLE 8

An antifreeze concentrate consisting of ethylene glycol, $Na_2B_4O_7.5H_2O$, $NaNO_3$, Na benzoate, tolyltriazole, 0.2 wt.% $Na_2SiO_3.5H_2O$ and 200 ppm of ethylenediamine triacetic acid (EDTA) was tested in a glassware corrosion test similar to ASTM D-1384. Results indicate that the above antifreeze is extremely corrosive to cast iron. One would expect an antifreeze prepared with Compound I of this invention to have the same effect since it is similar in structure to EDTA. From the results of the ASTM Glassware Corrosion Test (see Example 7), it can be seen that Compound I is unexpectedly not corrosive to cast iron, unlike EDTA.

Many modifications may be made in this invention without departing from its spirit and scope which is defined only in the appended claims. For example, one could determine that a particular combination of an organosiloxane having an EDTA solubilizing group and an alkali metal silicate would be particularly effective.

I claim:

1. A gellation resistant aqueous glycol composition comprising
   (a) 85 to 98 percent by weight of a glycol component selected from the group consisting of an alkylene glycol, an alkylene glycol ether and mixtures thereof,
   (b) an effective amount to reduce corrosion of an inorganic alkali metal silicate, and
   (c) an effective amount to improve gellation resistance of an organosiloxane having ethylenediamine triacetic acid as a solubilizing group.

2. The composition of claim 1 in which the alkylene glycol is ethylene glycol.

3. The composition of claim 1 in which the remainder of the composition is water and an effective amount of one or more corrosion inhibitors.

4. The composition of claim 1 in which the amount of organosiloxane ranges from about 100 to 10,000 ppm based on the total composition.

5. A gellation resistant aqueous glycol composition comprising
   (a) 85 to 98 percent by weight of an alkylene glycol, an alkylene glycol ether or mixtures thereof,
   (b) an effective amount to reduce corrosion of an inorganic alkali metal silicate, and
   (c) an effective amount to improve gellation resistance of N-(trimethoxysilylpropyl)ethylenediamine triacetic acid.

6. The composition of claim 5 in which the alkylene glycol is ethylene glycol.

7. The composition of claim 5 in which the remainder of the composition is water and an effective amount of one or more other corrosion inhibitors.

8. The composition of claim 5 in which the amount of N-(trimethoxysilylpropyl)ethylenediamine triacetic acid ranges from about 100 to 10,000 ppm based on the total composition.

9. A method for improving the gellation resistance of a corrosion inhibited aqueous glycol composition comprising adding to
   (a) a glycol composition comprising 85 to 98 percent by weight of a glycol component selected from the group consisting of an alkylene glycol, an alkylene glycol ether and mixtures thereof, and an effective amount to reduce corrosion of an inorganic alkali metal silicate,
   (b) an effective amount of an organosiloxane having ethylenediamine triacetic acid as a solubilizing group.

10. The method of claim 9 in which the organosiloxane is N-(trimethoxysilylpropyl)ethylenediamine triacetic acid.

11. The method of claim 9 in which the amount of organosiloxane compound ranges from about 100 to 10,000 ppm based on the total composition.

12. The method of claim 9 in which the alkylene glycol is ethylene glycol.

13. The method of claim 9 in which the remainder of the composition is water and an effective amount of one or more corrosion inhibitors.

* * * * *